March 15, 1932.  A. DE FRIES  1,849,176
WINDSCREEN
Filed Nov. 9, 1928

Inventor:
Alfred de Fries
By Monroe E. Miller
Attorney.

Patented Mar. 15, 1932

1,849,176

UNITED STATES PATENT OFFICE

ALFRED DE FRIES, OF CASSEL, GERMANY

WINDSCREEN

Application filed November 9, 1928, Serial No. 318,245, and in Germany May 8, 1928.

In vehicles running with high speed, especially in motor cars, the violent current of air, which arises in driving, is very annoying for the passengers of the car. If the air is saturated with soot and dust, this molestation will become even dangerous.

Apart from maladies of the respiratory organs caused by the draught, the numerous particles of soot or dust will easily hurt the eyes.

In coaches, sedans and other closed bodies the current of air which, entering through the open windows, flows back from the back of the car, the socalled neckwind, is very annoying and often the cause of very acute and chronic neuralgias.

The invention redresses these grievances by a wind-conductor which is suitably designed to arrest and deflect the current of air into the front part of the vehicle.

A construction embodying the features of the invention is shown in the accompanying drawings, wherein.

The wind-screen comprises a lower part or section 1 which is hinged, as at 3, to a strip 2 that is secured by screws to the door D of the vehicle body, at the rear edge of the opening, and said section 1 may be swung toward the door so that it will not obstruct passengers when entering and leaving the vehicle.

Figure 4:
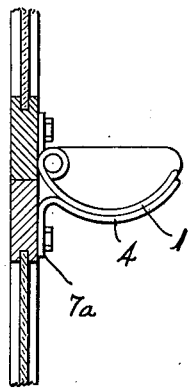
Fig. 4 is a plan view illustrating a modification.

The screen or guard has an upper part or section 4 having its lower end overlapping the upper end of the section 1. As seen in Fig. 4, the section 4 may be rigidly secured to the wall of the vehicle body by providing said section with a flange 7a fastened to said wall.

Figure 1:
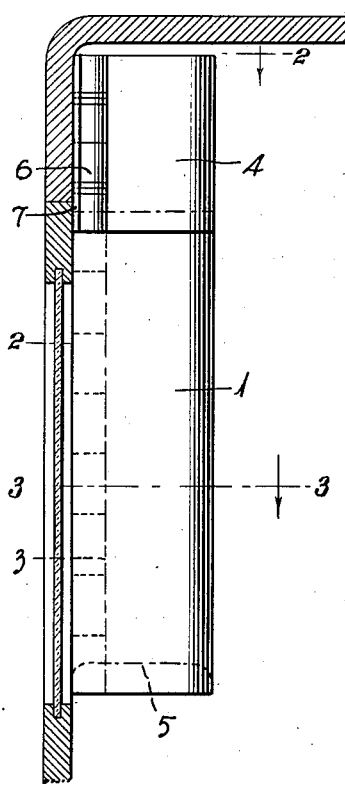
Figure 1 is a rear view of the wind-screen for a closed vehicle body, the body being shown in section on the line 1—1 of Fig. 2.
Figure 2:
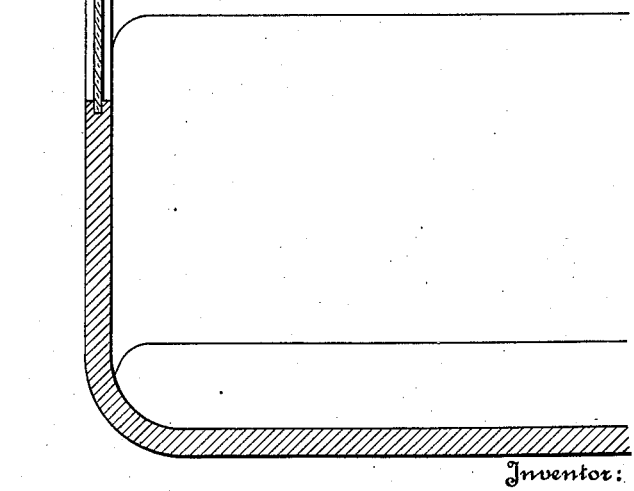
Fig. 2 is a plan view of the device, the vehicle body being shown in section on the line 2—2 of Fig. 1.

It is preferable, however, as seen in Figs. 1 and 2, to connect the section 4 by a hinge 6 with a strip 7 secured to the wall of the vehicle body, to enable the section 4 to swing toward said wall when the door is opened, so as not to form an obstruction.

The section 4 extends close to the roof of the vehicle body, and the section 4 is under light spring pressure in the direction of the door opening, so that when the section 1 is swung toward the door, the section 4 will swing under the spring influence toward the wall of the body. When the door is closed and the section 1 swung to operative position it will contact with the section 4 and swing it to operative position also.

Figure 3:
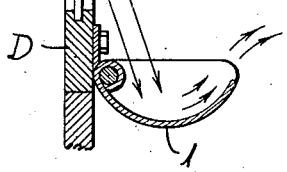
Fig. 3 is a section on the line 3—3 of Fig. 1 showing the flow of air in the direction of the arrows.

The sections 1 and 4 are concaved in horizontal cross-section, so as to have a better effect in deflecting the current of air into the front part of the vehicle, as seen by the arrows in Fig. 3, thereby avoiding the objectionable draft in rear of the opening.

It is understood that the separation of the parts 1 and 4 is only necessary, if one part of the screen is fixed to the door. In the other case, an undivided guard going up to the roof of the coach is sufficient.

In order to avoid part of the current of air caught by the screen flowing downwardly against the feet of the passenger sitting near the window, the lower part of the screen is closed by a shutter or sheet 5 of metal or other material, the rim of which is suitably turned upward. This sheet reflects the downward flowing current of air and breaks the force of the following.

The same or a similar shutter may of course be arranged at the upper end of the screen to prevent the upward flowing current of air from flowing past the upper end of the screen.

The wind-screen as described above permits of enjoying fresh air even in coaches, sedans and other closed vehicle bodies without being troubled by the current of air,—a true comfort in the hot season.

Instead of being fixed to the guard 1 the shutter 5 breaking the current of air directed downward may be fixed to the door or to the sidewall of the car separately from guard 1 and the result will be the same.

Having thus described the invention, what is claimed as new is:

1. The combination with a vehicle body having a side wall provided with a door having an opening, of a wind-screen having a section hingedly connected to the door at the rear edge of the opening and within the body, and having another section hingedly connected with said wall and within the body and spring influenced to swing toward said opening, the firstnamed section being arranged to contact with the secondnamed section for swinging the latter away from said wall with the firstnamed section.

2. The combination with a vehicle body having a side wall provided with a door having an opening, of a wind-screen having one section hingedly connected to said door at the rear edge of said opening and within the body, and having another section hingedly connected to said wall and within the body, one of said sections being adapted to swing with the other toward and away from said wall.

3. The combination with a vehicle body having a door with an opening therein, and a wind-screen comprising a lower section hingedly connected to said door and rearwardly of said opening, an upper section hingedly connected to the vehicle body and overlapping said lower section and extending substantially to the roof of the vehicle body, and a shutter adapted to close in the lower end of the lower section.

4. The combination with a vehicle body having a compartment with a door provided with an opening, of a windscreen attached to the door at the rear edge of said opening and within said compartment, and means for preventing the current of air which rushes in through said opening into said windscreen from flowing past the ends of said windscreen.

5. The combination with a vehicle body having a side wall provided with a door having an opening, of a windscreen having cooperable sections one carried by said door at the rear edge of said opening and within said body and the other section being fastened to said side wall, the firstnamed section being adapted to be swung toward said door.

In testimony whereof I affix my signature.

ALFRED DE FRIES.